United States Patent
Wang

(10) Patent No.: US 10,967,805 B2
(45) Date of Patent: Apr. 6, 2021

(54) BICYCLE FRONT WHEEL POSITIONING MEMBER OF BICYCLE CARRY RACK

(71) Applicant: Chiu Kuei Wang, Taichung (TW)

(72) Inventor: Chiu Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/711,360

(22) Filed: Dec. 11, 2019

(65) Prior Publication Data

US 2020/0406829 A1    Dec. 31, 2020

(30) Foreign Application Priority Data

Jun. 27, 2019 (TW) ................................. 108122514

(51) Int. Cl.
*B60R 9/10* (2006.01)
(52) U.S. Cl.
CPC ...................... *B60R 9/10* (2013.01)
(58) Field of Classification Search
CPC ... B60R 9/10; B60R 9/048; B60R 9/06; Y10S 224/924; B62H 3/08
See application file for complete search history.

(56) References Cited

U.S. PATENT DOCUMENTS

| | | | | |
|---|---|---|---|---|
| 4,524,893 A | * | 6/1985 | Cole | B60R 9/10 211/5 |
| 5,509,776 A | * | 4/1996 | Specht | B60R 9/042 414/462 |
| 6,092,706 A | * | 7/2000 | Bogan | B60R 9/10 224/401 |
| 10,183,627 B1 | * | 1/2019 | Liu | B60R 9/10 |
| 2011/0132946 A1 | * | 6/2011 | Sautter | B60R 9/10 224/324 |
| 2015/0283952 A1 | * | 10/2015 | Bukaric | B60R 9/10 224/545 |
| 2016/0068111 A1 | * | 3/2016 | Walker | B60R 9/06 224/521 |
| 2019/0193621 A1 | * | 6/2019 | Ayoub | B62H 3/08 |

* cited by examiner

*Primary Examiner* — Corey N Skurdal
(74) *Attorney, Agent, or Firm* — Che-Yang Chen; Law Office of Michael Chen

(57) ABSTRACT

A positioning member of a bicycle carry rack includes a base with a rear wheel support assembly and a front wheel support assembly. The rear wheel support assembly includes a rear wheel restricting unit which extends through the bicycle rear wheel and connected to the rear wheel adjustment unit to position the bicycle rear wheel. The front wheel support assembly includes a first restricting unit and a second restricting unit to secure the bicycle front wheel. The front wheel support assembly further includes a positioning member with a recess, and the bicycle front wheel is engaged with the recess so that the degree of freedom of the bicycle front wheel is controlled during transportation.

5 Claims, 5 Drawing Sheets

BICYCLE FRONT WHEEL POSITIONING MEMBER OF BICYCLE CARRY RACK

BACKGROUND OF THE INVENTION

1. Fields of the Invention

The present invention relates to a positioning member of a bicycle carry rack, and more particularly, to a positioning member of a bicycle carry rack for positioning the bicycle front wheel during transportation.

2. Descriptions of Related Art

The conventional bicycle carry racks generally include a front wheel support unit and a rear wheel support unit such that the front wheel and the rear wheel of the bicycle can be positioned. However, during the transportation, because the front wheel is connected with the front fork and can be freely rotated to hit the vehicle or parts of the next bicycle. In order to secure the front wheel, a strap is used to tie the front wheel to a fixed part of the bicycle carry rack. This is just a temporary way and the strap may be loosened.

The present invention is intended to provide a positioning member of a bicycle carry rack so that the bicycle front wheel can be properly positioned during transportation.

SUMMARY OF THE INVENTION

The present invention relates to a positioning member of a bicycle carry rack and comprises a base to which a support unit is connected. The support unit comprises a rear wheel support assembly and a front wheel support assembly, wherein the rear wheel support assembly and the front wheel support assembly are connected to the base by a connection unit. The rear wheel support assembly comprises a rear wheel securing unit which has a rear wheel tray, a rear wheel restricting unit and a rear wheel adjustment unit. The rear wheel restricting unit is connected to the rear wheel tray so as to support a bicycle rear wheel. The rear wheel restricting unit extends through the bicycle rear wheel and is connected to the rear wheel adjustment unit.

The front wheel support assembly comprises a front wheel securing unit which has a front wheel tray, a first restricting unit, a first adjustment unit, a positioning member, a second restricting unit and a second adjustment unit. The first restricting unit and the first adjustment unit are located at the first end of the front wheel tray. The first restricting unit extends through a bicycle front wheel and is connected to the first adjustment unit. The positioning member is located at the second end of the front wheel tray and pivotable relative to the front wheel support assembly. The positioning member is engaged with the bicycle front wheel. The second restricting unit and the second adjustment unit are connected to the positioning member. The second restricting unit extends through the bicycle front wheel and is connected to the second adjustment unit.

Preferably, each of the first restricting unit and the second restricting unit includes a teethed surface, and each of the first adjustment unit and the second adjustment unit include a spring pawl so as to be engaged with the teethed surface corresponding thereto.

Preferably, a light unit is located on outside of each of the rear wheel support assembly and the front wheel support assembly.

Preferably, each of the rear wheel support assembly and the front wheel support assembly is pivotable and foldable by the connection unit.

Preferably, the positioning member includes a recess which accommodates a portion of the bicycle front wheel.

The advantages of the present invention is that the degree of freedom of the bicycle front wheel is controlled during transportation.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
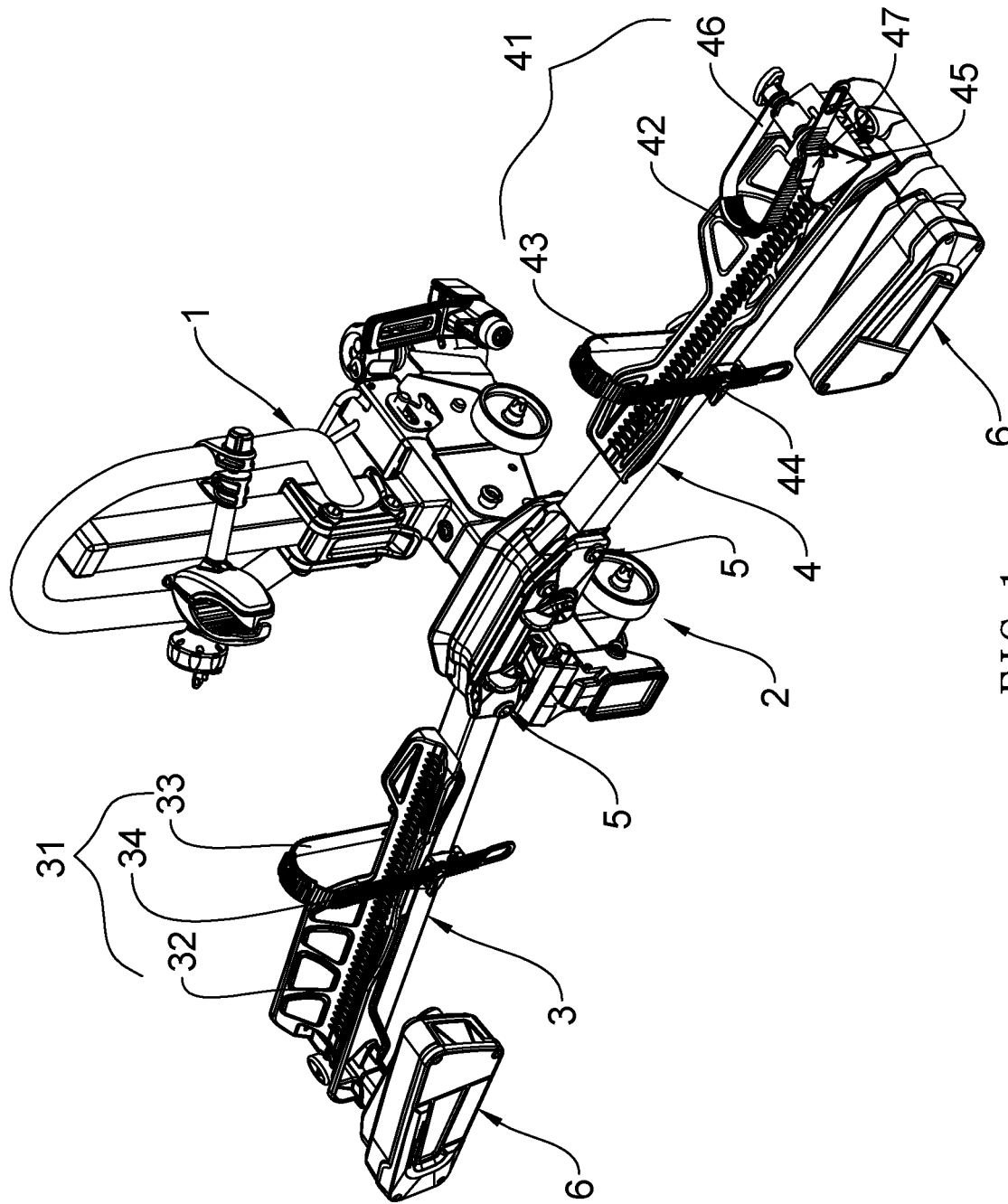
FIG. 1 is a perspective view to show the bicycle carry rack with the positioning member of the present invention.
Figure 2:
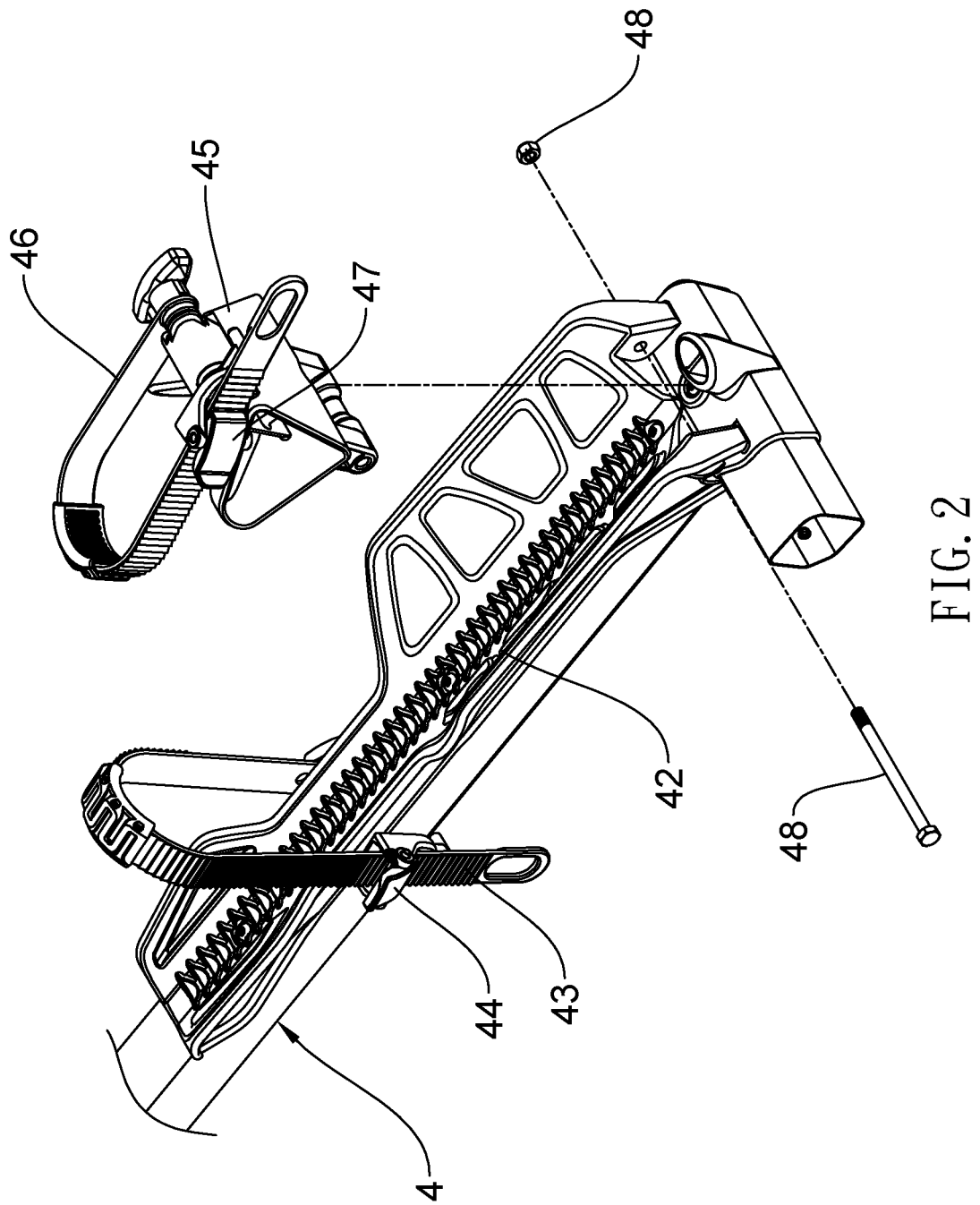
FIG. 2 is an exploded view of the front wheel support assembly of the present invention.

Referring to FIGS. 1 and 2, the positioning member of a bicycle carry rack of the present invention comprises a base 1 and a support unit 2 which is connected to the base 1. The base 1 is connected to a vehicle (not shown), and the support unit 2 comprises a rear wheel support assembly 3 and a front wheel support assembly 4. The rear wheel support assembly 3 and the front wheel support assembly 4 are connected to the base 1 by a connection unit 5.

The rear wheel support assembly 3 comprises a rear wheel securing unit 31, and the rear wheel securing unit 31 includes a rear wheel tray 32, a rear wheel restricting unit 33 and a rear wheel adjustment unit 34. The rear wheel restricting unit 33 is connected to the rear wheel tray 32 which is used to support a bicycle rear wheel (not shown). The rear wheel restricting unit 33 extends through the bicycle rear wheel and is connected to the rear wheel adjustment unit 34 to secure the bicycle rear wheel to the rear wheel support assembly 3.

As shown in FIGS. 2 to 6, the front wheel support assembly 4 comprises a front wheel securing unit 41, the front wheel securing unit 41 having a front wheel tray 42, a first restricting unit 43, a first adjustment unit 44, a positioning member 45, a second restricting unit 46 and a second adjustment unit 47. The first restricting unit 43 and the first adjustment unit 44 located at the first end of the front wheel tray 42. The first restricting unit 43 extends through a bicycle front wheel "W" and is connected to the first adjustment unit 44 so as to secure the bicycle front wheel "W". The positioning member 45 is located at the second end of the front wheel tray 42 by an axle 48 so that the positioning member 45 is pivotable relative to the front wheel support assembly 4 to prevent the bicycle front wheel "W" from sliding. The second restricting unit 46 and the second adjustment unit 47 are connected to the positioning member 45. The second restricting unit 46 extends through the bicycle front wheel "W" and is connected to the second adjustment unit 47 so as to secure the bicycle front wheel "W".

In order to provide safety consideration, a light unit 6 is located on outside of each of the rear wheel support assembly 3 and the front wheel support assembly 4.

Each of the rear wheel support assembly 3 and the front wheel support assembly 4 is pivotable and foldable by the connection unit 5 to save space.

As shown in FIGS. 1 to 4, each of the first restricting unit 43 and the second restricting unit 46 include a teethed surface. Each of the first adjustment unit 44 and the second adjustment unit 47 include a spring pawl so as to be engaged with the teethed surface corresponding thereto.

Figure 3:
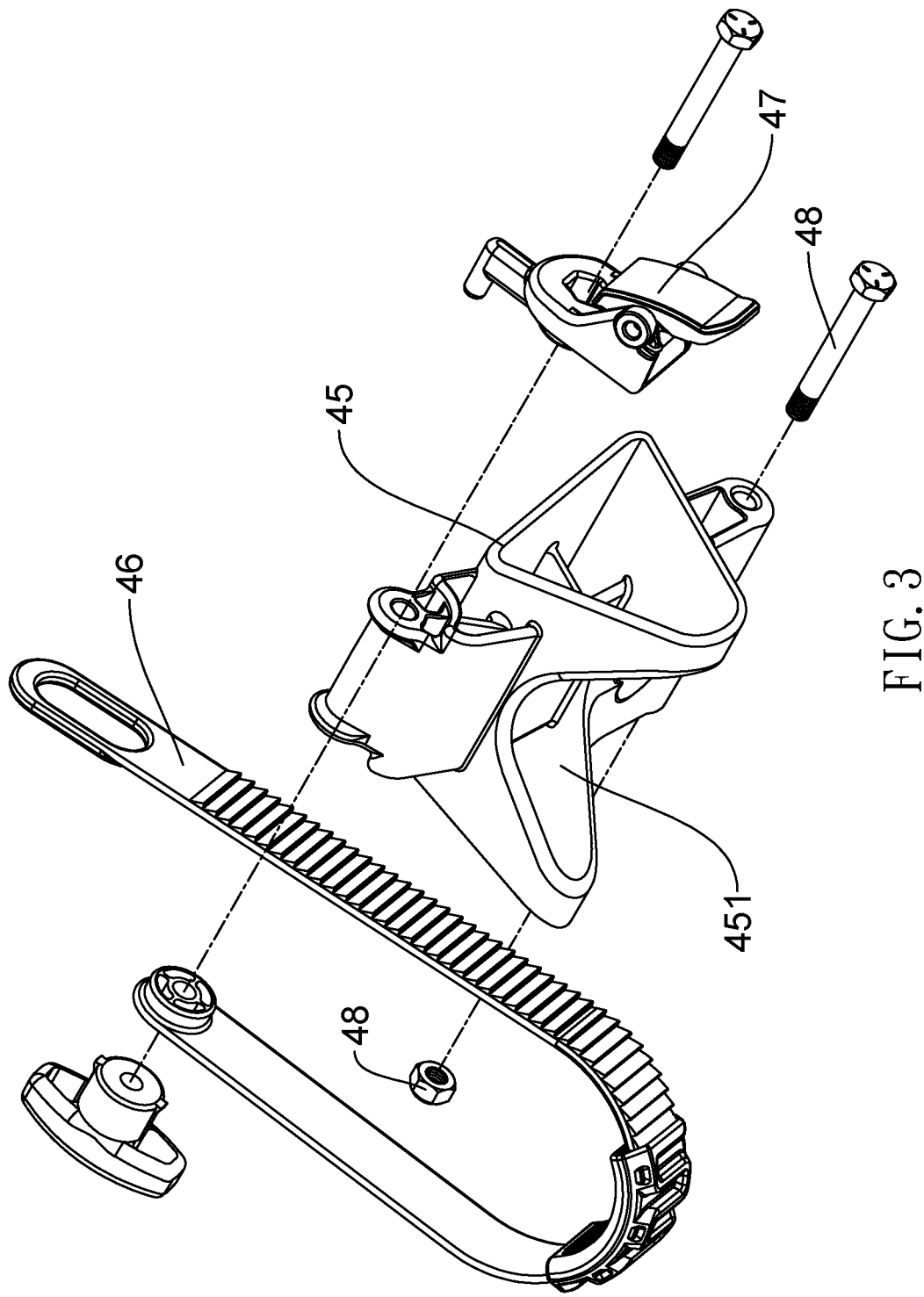
FIG. 3 shows the positioning member, the second restricting unit and the second adjustment unit of the present invention.
Figure 4:
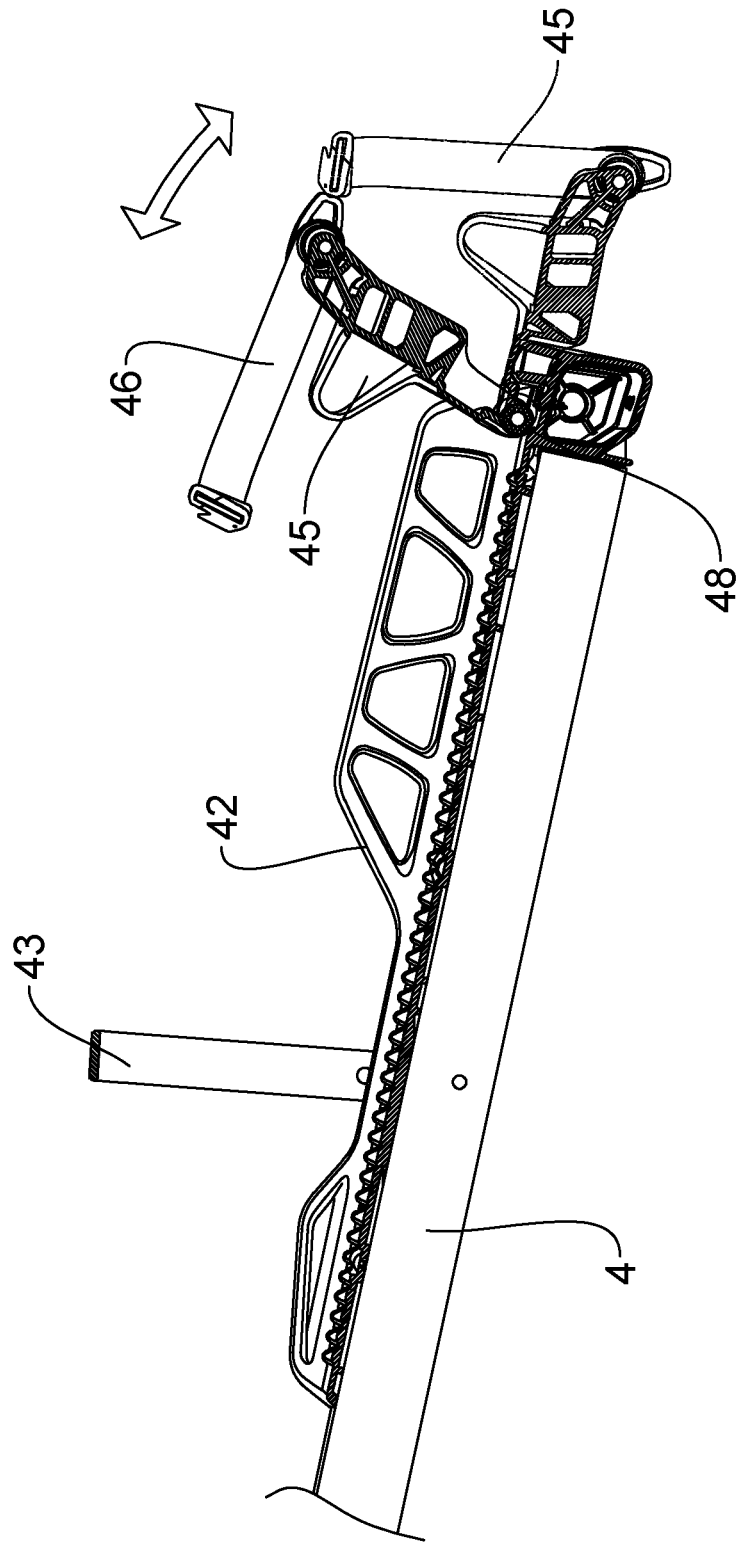
FIG. 4 shows that the positioning member of the present invention is pivotable.
Figure 5:
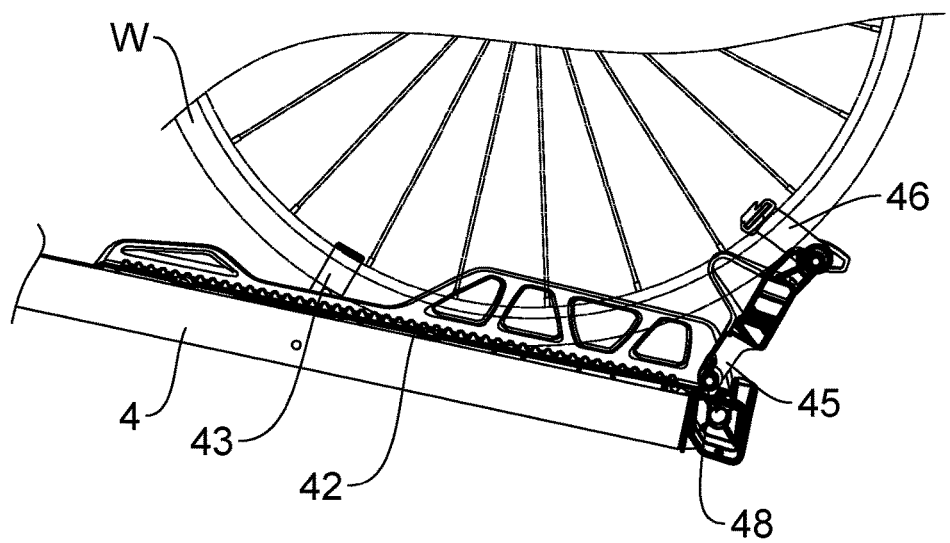
FIGS. 5 and 6 show that two bicycle front wheels of different sizes are positioned and secured by the present invention.
Figure 6:
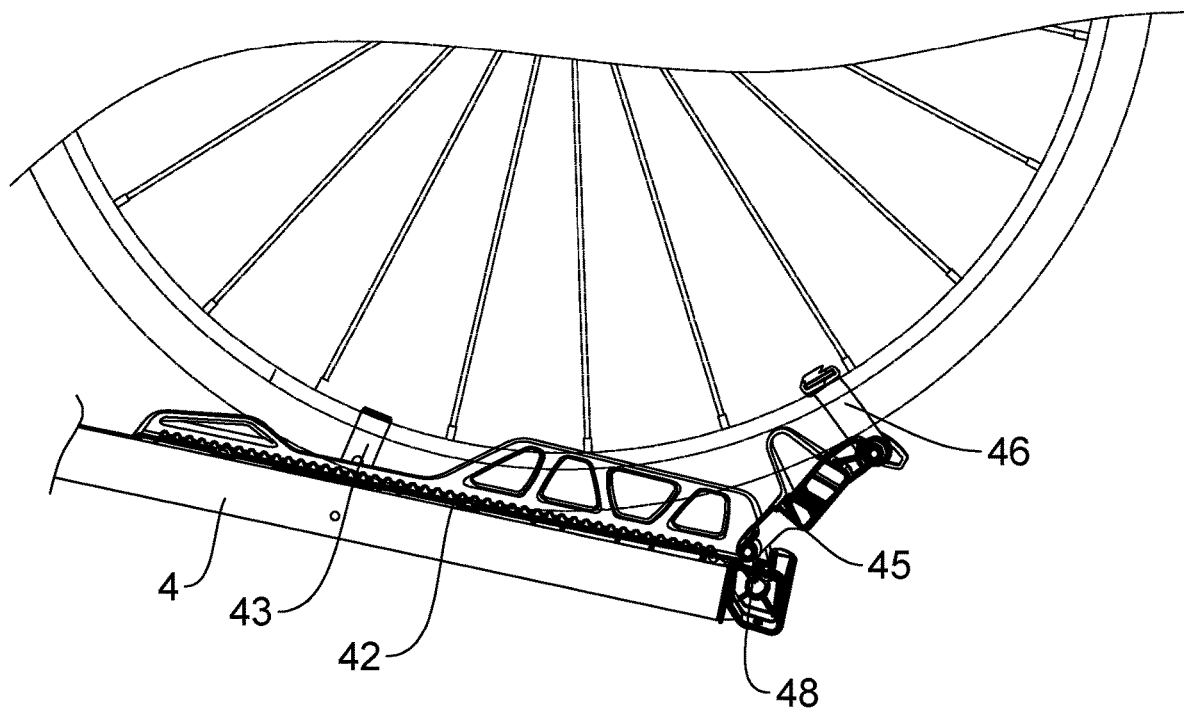

As shown in FIG. 3, the positioning member 45 includes a recess 451 which accommodates a portion of the bicycle front wheel "W" such that the positioning member 45 is able to stop the bicycle front wheel "W".

The present invention is easily operated and used without extra explanation. When the bicycle is positioned on the support unit 2, the rear wheel restricting unit 33 extends through the bicycle rear wheel and is connected to the rear wheel adjustment unit 34 which secures the rear wheel restricting unit 33 to secure the bicycle rear wheel to the rear wheel support assembly 3.

The first restricting unit 43 extends through the bicycle front wheel "W" and is connected to the first adjustment unit 44 so as to initially secure the bicycle front wheel "W". The bicycle front wheel "W" is then engaged with the recess 451 of the positioning member 45. The second restricting unit 46 extends through the bicycle front wheel "W" and is connected to the second adjustment unit 47 so as to finally secure the bicycle front wheel "W". By this way, the bicycle is more secured.

While we have shown and described the embodiment in accordance with the present invention, it should be clear to those skilled in the art that further embodiments may be made without departing from the scope of the present invention.

What is claimed is:

1. A member of a bicycle carry rack comprising:

a base;

a support unit connected to the base and comprising a rear wheel support assembly and a front wheel support assembly, the rear wheel support assembly and the front wheel support assembly connected to the base by a connection unit;

the rear wheel support assembly comprising a rear wheel securing unit, the rear wheel securing unit having a rear wheel tray, a rear wheel restricting unit and a rear wheel adjustment unit, the rear wheel restricting unit connected to the rear wheel tray which is adapted to support a bicycle rear wheel, the rear wheel restricting unit adapted to extend through the bicycle rear wheel and being connected to the rear wheel adjustment unit, and the front wheel support assembly comprising a front wheel securing unit, the front wheel securing unit having a front wheel tray, a first restricting unit, a first adjustment unit, a positioning member, a second restricting unit and a second adjustment unit, the first restricting unit and the first adjustment unit located at a first end of the front wheel tray, the first restricting unit adapted to extend through a bicycle front wheel and being connected to the first adjustment unit, the positioning member located at a second end of the front wheel tray and pivotable relative to the front wheel support assembly, the positioning member adapted to be engaged with the bicycle front wheel, the second restricting unit and the second adjustment unit connected to the positioning member, the second restricting unit adapted to extend through the bicycle front wheel and being connected to the second adjustment unit.

2. The member of a bicycle carry rack as claimed in claim 1, wherein each of the first restricting unit and the second restricting unit include a teethed surface, each of the first adjustment unit and the second adjustment unit include a spring pawl so as to be engaged with the teethed surface corresponding thereto.

3. The member of a bicycle carry rack as claimed in claim 1, wherein a light unit is located outside of each of the rear wheel support assembly and the front wheel support assembly.

4. The member of a bicycle carry rack as claimed in claim 1, wherein each of the rear wheel support assembly and the front wheel support assembly is pivotable and foldable by the connection unit.

5. The member of a bicycle carry rack as claimed in claim 1, wherein the positioning member includes a recess which is adapted to accommodate a portion of the bicycle front wheel.

\* \* \* \* \*